(12) United States Patent
Youn et al.

(10) Patent No.: US 6,445,879 B1
(45) Date of Patent: Sep. 3, 2002

(54) APPARATUS AND METHOD FOR BRAKING A WASHING MACHINE

(75) Inventors: Sang Chul Youn, Kyunggi-do; Joo Hwan Lee; Chul Woong Lee, both of Seoul; In Hwan Ra, Kyunggi-do; Beom Seok Ko, Seoul, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/612,918

(22) Filed: Jul. 10, 2000

(30) Foreign Application Priority Data

| Jul. 21, 1999 | (KR) | 99/29580 |
| Oct. 12, 1999 | (KR) | 99/44145 |
| Oct. 12, 1999 | (KR) | 99/44147 |
| Oct. 12, 1999 | (KR) | 99/44151 |
| Oct. 12, 1999 | (KR) | 99/44152 |

(51) Int. Cl.$^7$ ............................................. H02P 5/17
(52) U.S. Cl. .................. 388/811; 388/906; 388/907.5; 318/245; 318/438
(58) Field of Search ................... 318/244–252, 318/798–811, 729, 749; 388/809–824; 363/124, 125, 37

(56) References Cited

U.S. PATENT DOCUMENTS

| 5,577,153 A | * | 11/1996 | Bocchiola | 388/811 |
| 5,994,869 A | * | 11/1999 | Becerra | 318/729 |
| 6,016,041 A | * | 1/2000 | Weinmann | 318/245 |

FOREIGN PATENT DOCUMENTS

| JP | 10-257788 | 9/1998 |
| JP | 10-262392 | 9/1998 |

\* cited by examiner

*Primary Examiner*—Khanh Dang
(74) *Attorney, Agent, or Firm*—Fleshner & Kim, LLP

(57) ABSTRACT

A method for braking a washing machine in accordance with the present invention comprising the steps of: setting up an initial data of a duty ratio corresponding to a detected speed and a rotating position; discharging a voltage of the capacitor filter during a duty-on cycle according to the duty ratio set up in the preceding step; and charging a voltage to the capacitor filter during duty-off cycle when the duty-on cycle of the preceding step is finished. As described above, the dynamic braking resistor is not used in the method for braking the washing machine according to the present invention so that the size and the production cost are reduced.

10 Claims, 11 Drawing Sheets

APPARATUS AND METHOD FOR BRAKING A WASHING MACHINE

BACKGROUND OF THE INVENTION

1. Field of the Invention

This invention relates to an apparatus and method for braking a washing machine. More particularly, this invention relates to an apparatus and a method for braking a washing machine without using a capacity dynamic braking resistor.

2. Description of the Prior Art

Referring to FIG. 1, the conventional braking system for a washing machine comprises: a rectifier 101 converting the AC power of the system to the DC voltage; a capacitor filter 102 smoothing the rectified DC voltage; a motor driver 103 driving the motor by using the smoothed DC voltage; a voltage detector 104 detecting the voltage of the system when the motor M is suddenly braked; a voltage comparator 105 comparing the detected voltage of the voltage detector 104 and the reference voltage which is previously specified in the system; a switch element 106 determining the on/off functions of the dynamic brake resistor R1 according to the comparison result of the voltage comparator 105; a sensor 107 detecting a revolution position and the rotating speed of the motor M; a microcomputer 108 controlling the motor operation by using the sensor 107 output signal and the overall logic in relation to the over-flown voltage in the system; and a signal output device 109 generating a control signal in accordance with the control of the microcomputer 108.

The dynamic braking resistor R1 discharges the revival voltage into thermal energy to protect the system when the inertia energy of the motor or the load converts to electric energy resulting in increase of the revival voltage charged in the capacitor filter 102.

Referring to FIG. 1, the overall operation of the conventional braking system for a washing machine is described hereinafter.

Firstly, the commercial AC power supplied from the outside power source is converted by the rectifier 101 into the DC voltage which is then smoothed by the capacitor filter 102 before being supplied to the motor driver 103.

A washing machine is operated as the motor driver 103 converts the DC voltage smoothed by the capacitor filter 102 to drive the motor M.

However, in the event that a lid of a washing machine is opened during the dehydration operation or an unbalance state of the tub is detected, the rapidly rotating motor M must be braked to make a sudden stop of the tub.

The motor M is a brushless DC motor and the current flows in a discharged direction from the capacitor filter 102 to the motor M as the motor M becomes the load during the normal washing operation.

However, if the motor M is suddenly braked while it's in the rapidly rotating state, the motor M becomes a power generator and then a direction of flow of the current changes to the charged direction which is from the motor M to the capacitor filter 102 due to the induction electromotive power generated from the motor M.

At this point, if the revival voltage charged in the capacitor filter 102 is not discharged, the voltage level increases to a level exceeding the inner voltage of the designed circuit damaging the peripheral circuit and devices.

Therefore, the conventional system is equipped with the voltage detector 104, the voltage comparator 105 and the dynamic braking resistor R1 in order to discharge the over-flown voltage in the system resulted from braking of the motor.

In event that the motor M is braked during the washing or dehydration process, the voltage detector 104 measures the voltage between the capacitor filter 102 and the motor M, and the measured voltage is delivered to the voltage comparator 105.

Thereafter, the voltage comparator 105 compares the voltage between the reference voltage Vref and the detected voltage Vdc measured by the voltage detector 104. And the result of comparison is then outputted to the switching element 106, where the on/off control functions are performed. If the detected voltage Vdc exceeds the reference voltage Vref, the braking resistor R1 is activated as the switching element 106 turns to on state.

As a result, the over-flown voltage generated between the capacitor filter 102 and the motor M does not flow to the capacitor filter 102, but instead to the dynamic braking resistor R1 thereby the system is maintained at the regular voltage-level as the over-flown voltage is discharged into thermal energy.

When the detected voltage Vdc between the capacitor filter 102 and the motor M is lower than the reference voltage Vref, the braking resistor R1 is turned to off state by the switching element 106. The motor M is then braked as the current is flowing only to the capacitor filter 102 and not to the dynamic braking resistor.

In the event that the motor M is decelerated quickly or the load inertia of the motor M becomes massive, the revival energy generated by the motor M becomes much greater, and the revival energy is revived to the motor driver 103, causing a rise in the voltage that are being charged to the capacitor filter 102. If the DC voltage rise over 380V, the dynamic braking resistor R1 is activated to discharge the revival energy into thermal energy.

One of the disadvantages of the conventional method is that the size and the capacity of the dynamic braking resistor R1 installed on the outer part of the system is large making the system more complicated, thus increase the production cost of the system.

SUMMARY OF THE INVENTION

It is a primary object of the present invention to provide an apparatus and method for braking a washing machine without using the dynamic braking resistor.

It is another object of this invention to provide an apparatus and method for braking a washing machine for effectively processing the over-flown voltage in the system due to the motor braking result of the interruption of electric power or in the event of emergency motor braking.

It is a still another object of this invention to provide an apparatus and method for braking a washing machine for smoothly operating the braking of a washing machine by setting up a plurality of braking modes in which each mode has a different barking capability, and the braking mode is selected based on the rotating speed of the motor.

These and other objects are satisfied an apparatus for braking a washing machine comprising: a rectifier for converting the AC power of the system to the DC voltage; a capacitor filter for smoothing a rectified DC voltage; a motor driver for driving the motor by converting a smoothed DC voltage to a three-phase voltage and frequency; a voltage detector for detecting the smoothed DC voltage in real-time; a sensor detecting for a position and a speed the motor in real-time; and a microcomputer for outputting a control signal based on a comparison between an output signal of a sensor and a predetermined reference voltage to activate charge /discharge operations of the voltage between a capacitor filter and a motor.

Other objects of the invention are satisfied by the apparatus for braking a washing machine comprising: a converter for converting the power supplied from the outer power source into a voltage necessary for the system, and performing switching operation according to the control signal; a capacitor filter for stably smoothing the converted voltage by said converter; a motor driver for generating the voltage in order to drive the motor through the voltage inputted from the capacitor filter; a voltage detector placed in between the motor driver and the capacitor filter for detecting the voltage flowing in the system; a sensor for detecting a motor position and speed; and a microcomputer for outputting a control signal to control the converter and the motor driver based signals inputted from the voltage detector and the sensor.

Other objects of the present invention are satisfied by a method for braking a washing machine comprising the steps of: setting up an initial data of a duty ratio corresponding to a detected speed and a rotating position; discharging a voltage of the capacitor filter during a duty-on cycle according to the duty ratio set up in the preceding step ; and charging a voltage to the capacitor filter during duty-off cycle when the duty-on cycle of the preceding step is finished.

Other objects of the present invention are satisfied by a method for braking a washing machine comprising the steps of: initializing the system so that a current of the motor driver is directed to flow to the motor; detecting the voltage flowing in the system when braking the motor to compare with the reference voltage; reversing the current direction to the opposite direction when the comparison result of the preceding step indicates that the detected voltage is higher than the reference voltage.

Other objects of the present invention are satisfied by a method for braking a washing machine comprising the steps of: initiating a first braking mode at the same time as a start of the braking; comparing a detected motor speed with the reference speed while the preceding step is performing; and initiating the second braking mode when the motor speed is determined to be slower than the reference speed until the motor is stopped.

Other objects of the present invention are satisfied by a method for braking a washing machine comprising the steps of: initiating a first braking mode at the same time as a start of the braking; comparing a detected motor speed with the reference speed while the previous step is performing; initiating the second braking mode when the motor speed is determined to be slower than the reference speed until the motor is stopped; comparing a detected motor speed with the reference speed of the second braking mode while the preceding step is performing; and initiating the second braking mode when the motor speed is determined in the preceding step to be slower than the reference speed until the motor is stopped.

Other objects of the present invention are satisfied by a method for braking a washing machine comprising the steps of: determining whether the normal braking mode according to the normal operation finish or the emergency braking mode; setting up the phase and duty ratio according to the corresponding braking mode determined in the preceding step, and outputting the control signal, comparing the detected voltage flowing in the system with the reference voltage; and determining whether to maintain or re-set the phase and the duty ratio based on the comparison result of the preceding step.

Other objects of the present invention are satisfied by a method for braking a washing machine comprising the steps of: determining whether or not an interruption of electric power of the system has been occurred; setting up the initial data based on the result of the preceding step, and if the interruption of electric power has been occurred, then the initial phase and the duty ratio are set up and the control signal is outputted for braking the motor; detecting the voltage flowing in the system, and comparing it to the reference voltage after the initial data of the preceding step has been set up; and braking the motor by either maintaining or re-setting the phase and the duty ratio based on the comparison result of the preceding step.

Other features and advantages of the present invention will be readily apparent by reference to the following detailed description and accompanying drawings.

DETAILED DESCRIPTION OF THE INVENTION

Figure 1:
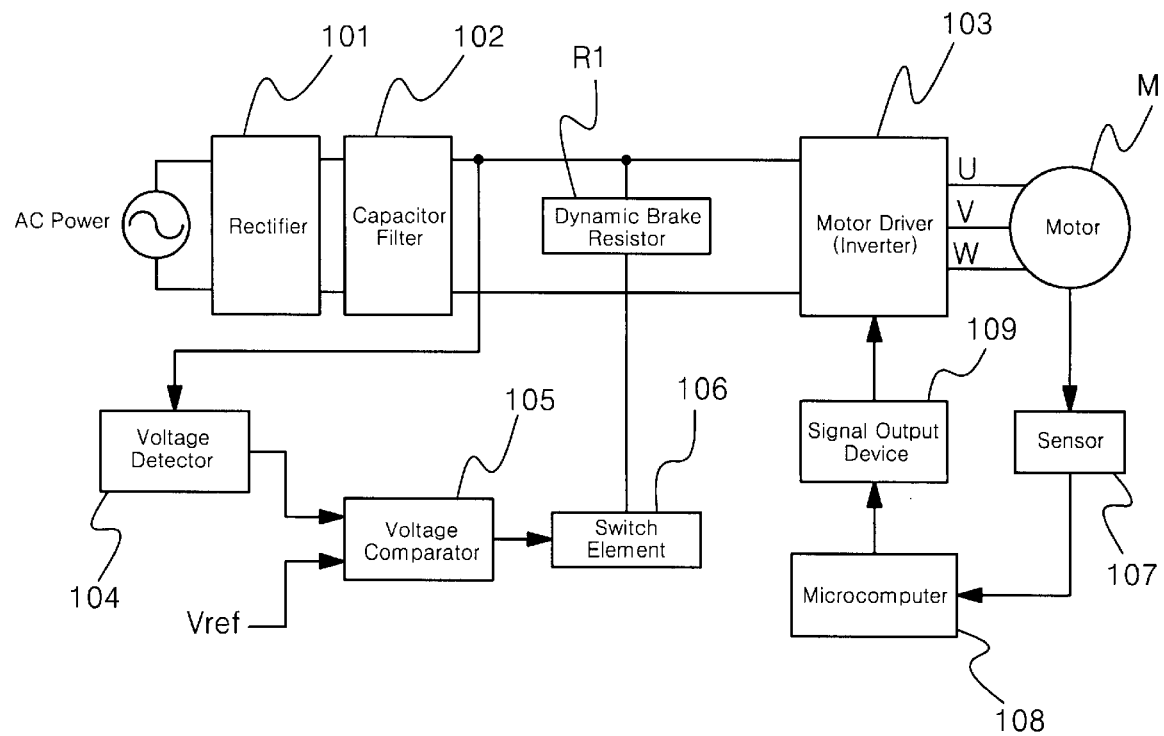
FIG. 1 is a block diagram of the conventional method for braking a washing machine.
Figure 2:
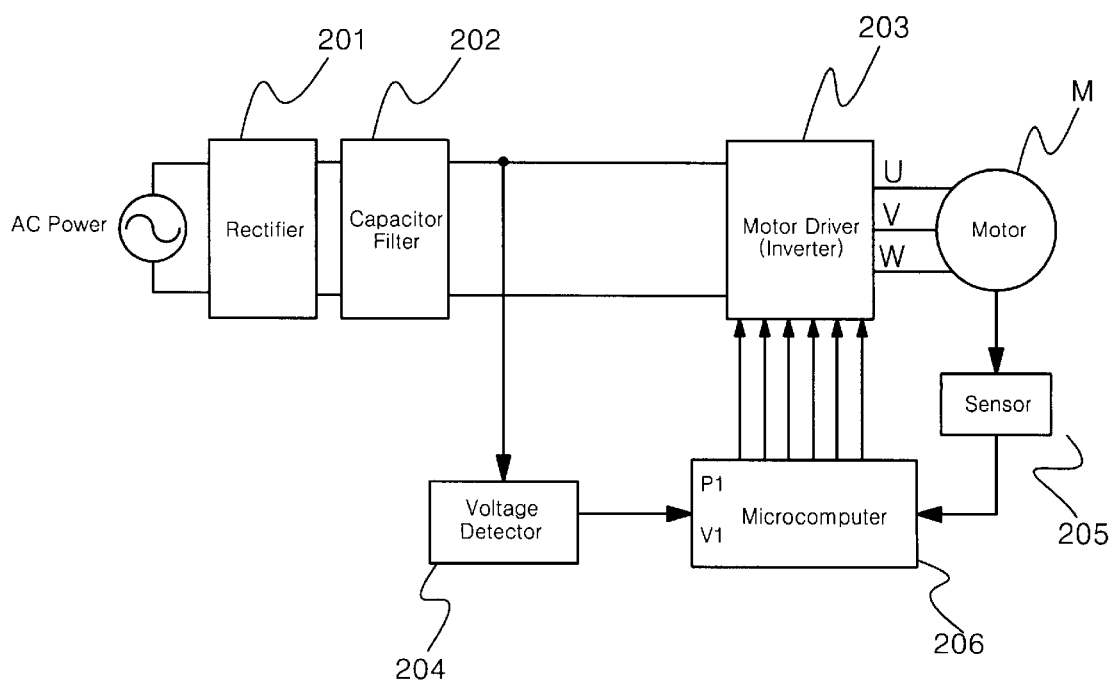
FIG. 2 is a block diagram of the first embodiment of an apparatus for braking a washing machine in accordance with the present invention.
Figure 3:
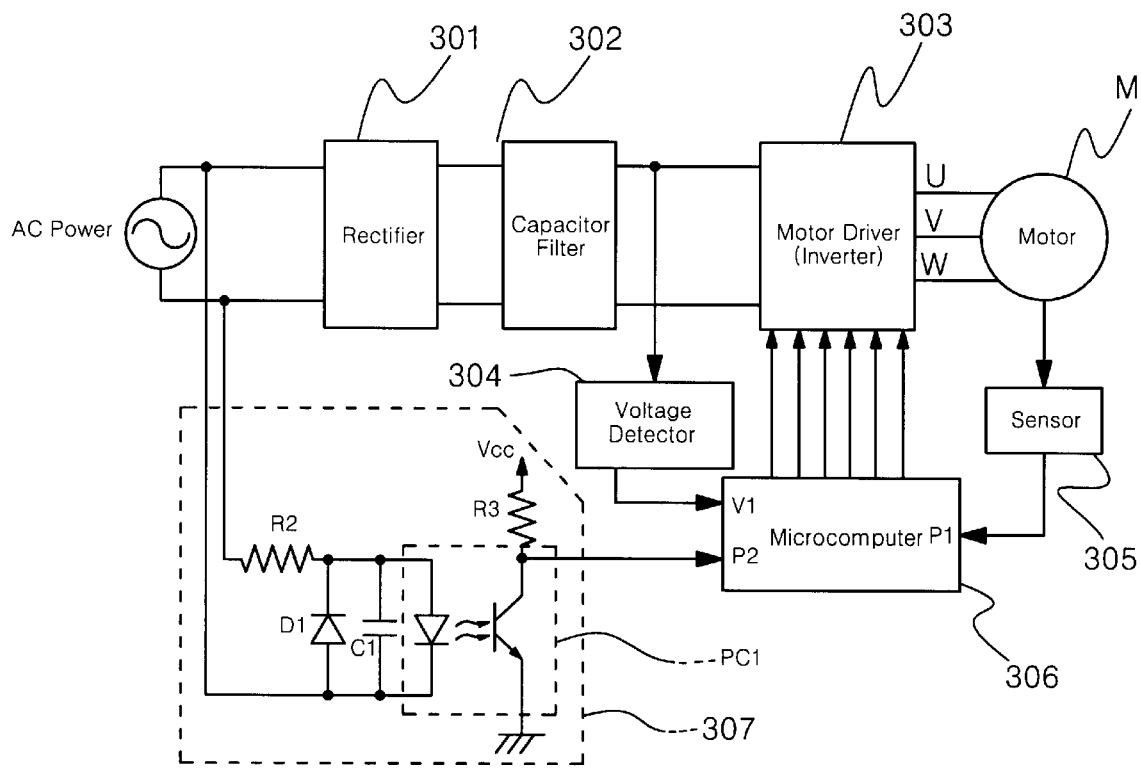
FIG. 3 is a block diagram of the second embodiment of the apparatus for braking a washing machine in accordance with the present invention.

Now, the overall operation of the preferred embodiment of the invention, as referring to drawings, is as follows:

FIG. 2 is a block diagram of a preferred embodiment of an apparatus for braking a washing machine in accordance with the present invention. And FIG. 3 is a block diagram of an apparatus for braking a washing machine with the detector for monitoring an interruption of electric power in accordance with the present invention. And FIG. 4 is a block diagram of the motor driver of an apparatus for braking a washing machine accordance with the present invention.

Figure 4:
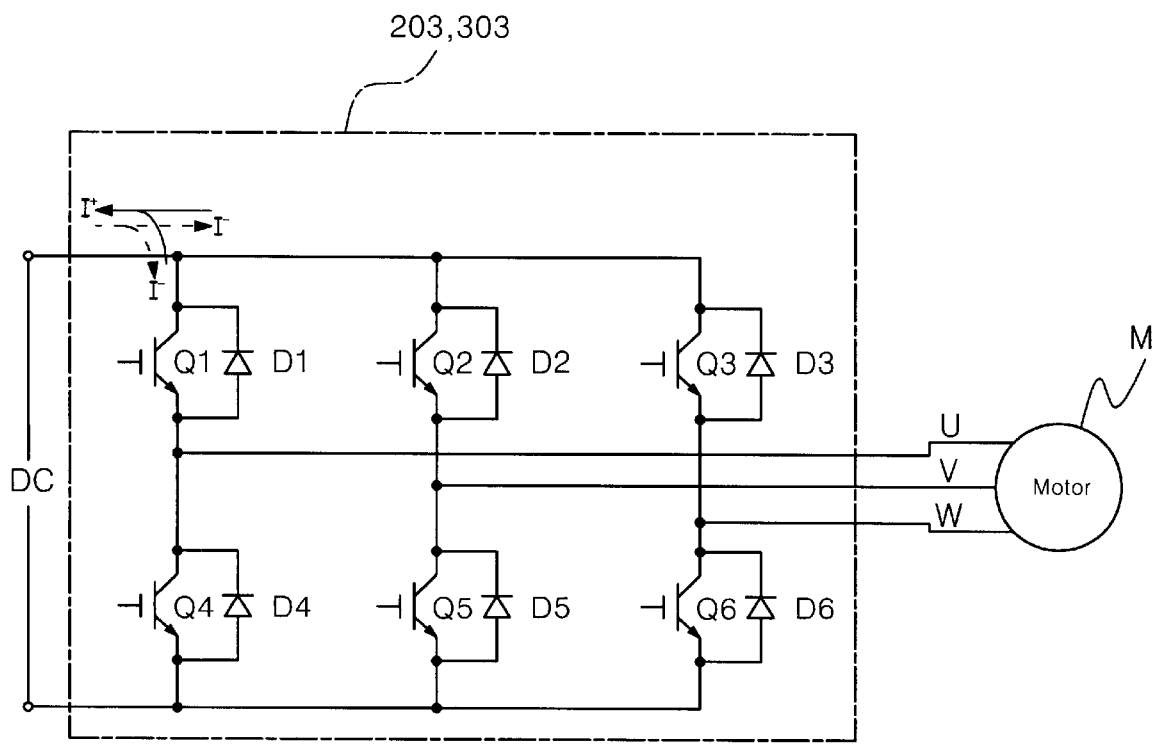
FIG. 4 a detailed circuit diagram of the motor driver of the apparatus for braking a washing machine in accordance with the present invention illustrated in FIG. 2 and FIG. 3.

Referring to FIG. 2, FIG. 3 and FIG. 4, an apparatus for braking a washing machine according to the present invention comprises: a rectifier 201 for converting the AC power of the system to the DC voltage; a capacitor filter 202 for smoothing the rectified DC voltage; a motor driver for driving 203 the motor M by converting the smoothed DC voltage to a three-phase voltage and frequency; a voltage detector 204 for detecting a smoothed DC voltage in real-time; and a sensor 205 for detecting the position and the speed of the motor in real-time; and a microcomputer 206 for outputting a control signal to the motor driver 203 as the phase and the duty ratio corresponding to the motor M speed and the voltage detected the voltage detector 204 is set up.

The motor driver 203, referring to FIG. 4, comprises: a plurality of high speed switching devices Q1 to Q6; and a plurality of free wheeling diodes D1 to D6 connected in reverse parallel to the switching device Q1 to Q6. And, a plurality of switching devices Q1~Q3 connected to the higher voltage are paired with a plurality of switching devices Q4~Q6 connected to the lower voltage, respectively, to supply a regular AC voltage to each phase U, V, W of the motor M.

A preferred embodiment of a method for braking a washing machine according to the present invention will be described in detail hereinafter with reference to the accompanying drawings.

Referring to FIG. 2 and FIG. 4, when a commercial AC electric power with an uniform frequency and an uniform width generally used in a home, a commercial area and an industry flows in from the outer power source, the AC electric power is rectified to the DC voltage by the rectifier 201 which is then stably smoothed by the capacitor filter 202 before being supplied to the motor driver 203.

The motor driver 203 drives the motor M by using three-phase AC voltage U, V and W and the frequency through a high-speed switching with a plurality of switching devices Q1 to Q6 in order to arbitrarily control the voltage or the current capacity and the frequency supplied to the motor via the capacitor filter 202, thereby a washing process, a rinsing process and dehydration process are performed.

The switching device Q1 to Q6 is a high-speed switching device such as IGBT (Insulated Gate Bipolar Transistor). And the switching device Q1 to Q6 is composed of the high-voltage section individually paired with corresponding low-voltage sections Q1 and Q4, Q2 and Q5, Q3, and Q6, respectively, to supply the specified AC voltage to the corresponding phase U, V and W of the motor. And when the switching device Q1 to Q6 at the off status, the revival current (I+) flows through the diode D1 to D6 connected in reverse parallel to the switching device Q1~to Q6.

And, the voltage detector 204 detects the smoothed DC voltage in real time, and the detected voltage is outputted to the microcomputer 206. The speed detector 205 detects the rotational speed based on the rotator position in each phase U, V, W of the motor M and the information on the phase differences. And then, the detected rotational speed is outputted to the microcomputer 206.

And, the microcomputer 206 compares the detected voltage $V_{DC}$ inputted from the voltage detector 204 and the detected rotational speed sent from the speed detector 205 with the pre-programmed desired speed. Then the result of the comparison is used to control the switching device Q1 to Q6 of the motor driver 203 so that the motor speed reaches a desired speed.

The signal transferred to the motor driver 203 from the microcomputer 206 is a PWM (Pulse Width Modulation) control signal which controls the on/off functions of each switching device Q1 to Q6 of the motor driver 203 and the diode D1 to D6 connected in reverse parallel to the switching device, thereby the width of the output pulse is transformed in order for the current flown in the motor M becomes an approximate sine wave.

In the event that a lid of a washing machine is opened during the dehydration process or the unbalance state of the tub is detected, the microcomputer 206 immediately brakes the rapidly rotating motor M to make a sudden stop of the tub. When the motor M makes such sudden stop, the motor M acts as the induction motor as the motor is decelerated by the motor driver 203, and the revival voltage flows to the motor driver 203. The revival voltage is then charged to the capacitor filter 202 which cause the voltage level to increase.

And, the microcomputer 206 detects the voltage $V_{DC}$ between the capacitor filter 202 and the motor driver 203 through the voltage detector 204 to set up the initial phase and the duty ratio, and then the PWM control signal is outputted to the motor driver 203. As a result, the logical charge-discharge loop between the motor M and the capacitor filter 202 is established, and the phase and the duty ratio get to be varied. Thereafter, the capacity and the variant width of the voltage $V_{DC}$ detected in real time by the voltage detector 204 is compared with the predetermined inner reference level Vref, $\Delta V$ to determine the operation of the emergency braking device.

The motor driver 203 is made up of an inverter that controls the speed of the three-phase induction generator by deviating the voltage and the frequency of the three-phase AC. The control signal is delivered from the microcomputer 206 to the base terminal of a plurality of transistors Q1, Q2, Q3, Q4, Q5 and Q6 at the same time as the motor M is driving. The control signal selectively turns the transistor switch to either on or off to allow the current to flow in I-direction, which is from the capacitor filter 202 to the motor M. The motor M is driven as the voltage is supplied to the motor M from the capacitor filter 202.

In the event that an sudden braking a washing machine occurs, the induction voltage is generates in the motor M and the transistors, which had been selectively turned on or off to allow the current to flow to the motor M (I− direction), is put into reverse gear to make the current to flow from the capacitor filter 202 to the motor M through the diodes D1 to D6 connected in reverse parallel to each transistor. Thereupon, the voltage generated by the induction voltage of the motor M is charged to the capacitor filter 202 thereof.

The microcomputer 206 continuously receive the voltage measured by the voltage detector 204 and the signal delivered from the sensor 205 detecting the speed and the position of the motor M to generate the PWM (Pulse Width Modulation) duty signal which is then supplied to the motor driver 203. A plurality of transistors Q1 to Q6 of the motor driver 203 are selectively turned on or off based on the PWM duty signal delivered by the microcomputer 206 thereof to create a path in which the current can flow through. Accordingly, the current direction can be changed from the motor M to the capacitor filter 202(I+ direction) or from the capacitor filter 202 to the motor M (I− direction).

Thus, in the event that the motor M is braked suddenly, the voltage of the capacitor filter 202 is maintained at a normal level as the voltage is either charged or discharged based on the capacitor filter 202 standard.

Moreover, the volume of charged voltage is decided by the motor driver 203 based on the duty ratio of PWM signal supplied from the microcomputer 206. The relation between adjustment of the duty ratio and the charged or discharged voltage is $$Dratio = \frac{Ton}{Ton + Toff}$$

established based on following mathematical equation:

Where, Ton is a time of switch-on interval of the switching device Q1 to Q6, and Toff is a time of switch-off interval of the switching device Q1 to Q6. Since the denominator of the duty ratio is a fixed value, the duty ratio is determined by the value of Ton.

Accordingly, as the duty ratio increase the value of the Ton also increase, which means increase in the charge capacity of the revival voltage of the motor M and decrease in the charge capacity of the capacitor filter 202. On the contrary, if value of the duty ratio means is small then the value of the Ton is also small meaning that decrease in the charge capacity of the revival voltage of the motor M make and increase in the charge capacity of the capacitor filter 202.

FIG. 3 is a block diagram of the second preferred embodiment of the apparatus for braking a washing machine in accordance with the present invention.

Referring to FIG. 3, in the second preferred embodiment of an apparatus for braking a washing machine in accordance with the present invention, a detector for an interruption of electric power, which monitors whether or not electric power from the commercial AC power has been interrupted and relay the corresponding signal to the microcomputer, has been added to an apparatus according to the first embodiment of the present invention.

If the commercial AC power supplied to a washing machine is interrupted, then a photo-coupler PC1 placed in the interruption detector 307 connected to the commercial AC power becomes off and the high signal supplied to the collector terminal of the transistor of the photo-coupler PC1 is relayed to the microcomputer 306.

The microcomputer 306 sets up the initial phase and the duty ratio according to the inputted signal sent from the interruption detector 307 and delivers the adjusted PWM control signal to a motor driver 303 to reduce the motor M speed.

The detailed description is omitted since the logical charged/discharged loop made between the motor M and a capacitor filter 302 based on the control signal of the microcomputer 306 and variance of the phase and the duty ratio are same as the process described in the first preferred embodiment.

Figure 5:
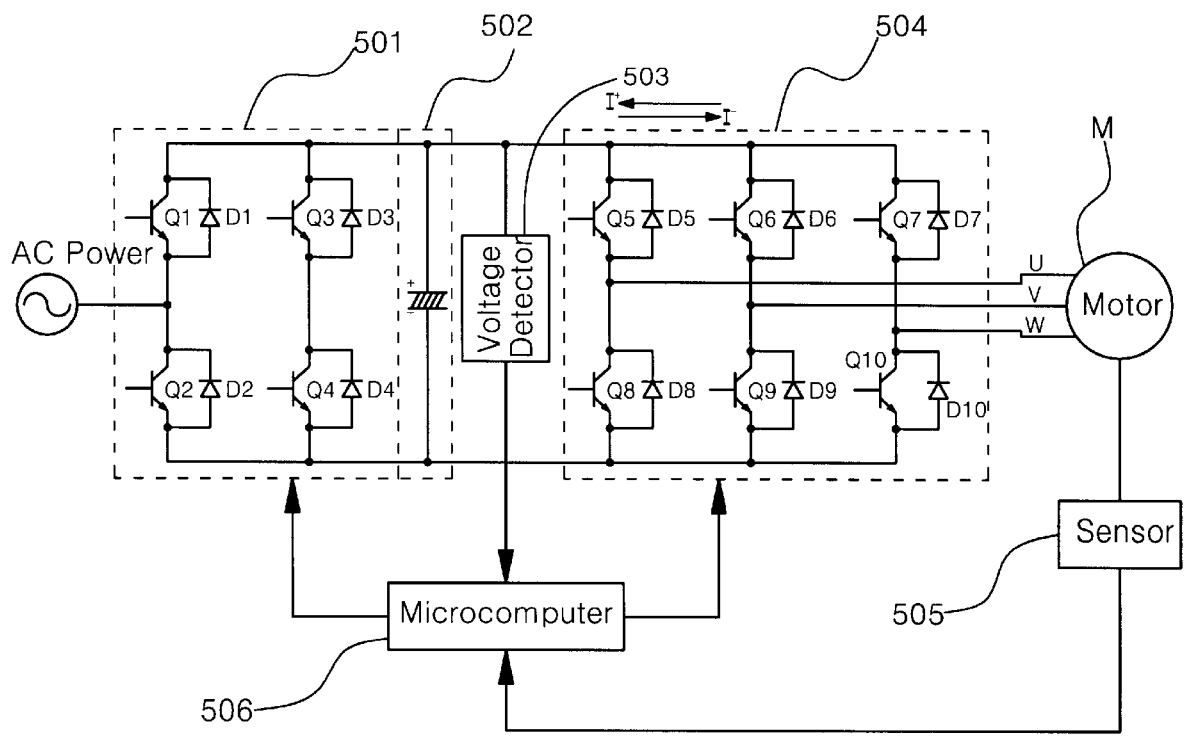
FIG. 5 is a block diagram of third embodiment of the apparatus for braking a washing machine in accordance with the present invention.
Figure 6:
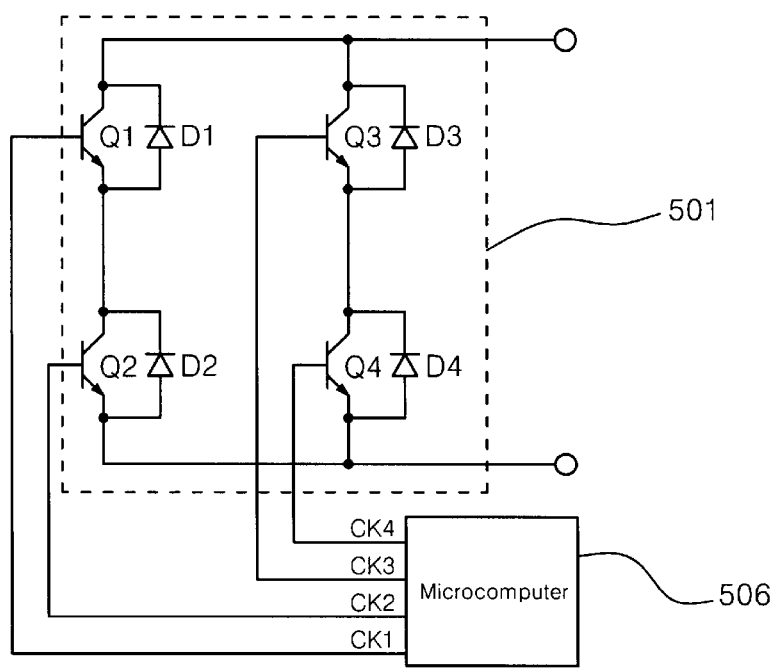
FIG. 6 is a detailed circuit diagram of the converter for braking a washing machine illustrated in FIG. 5.

FIG. 5 is a block diagram of the third preferred embodiment of an apparatus for braking a washing machine in accordance with the present invention. FIG. 6 is a circuit diagram of the converter for braking a washing machine illustrated in FIG. 5. And FIG. 7 is a timing chart of the control signal relayed to the converter illustrated in FIG. 6.

Figure 7:
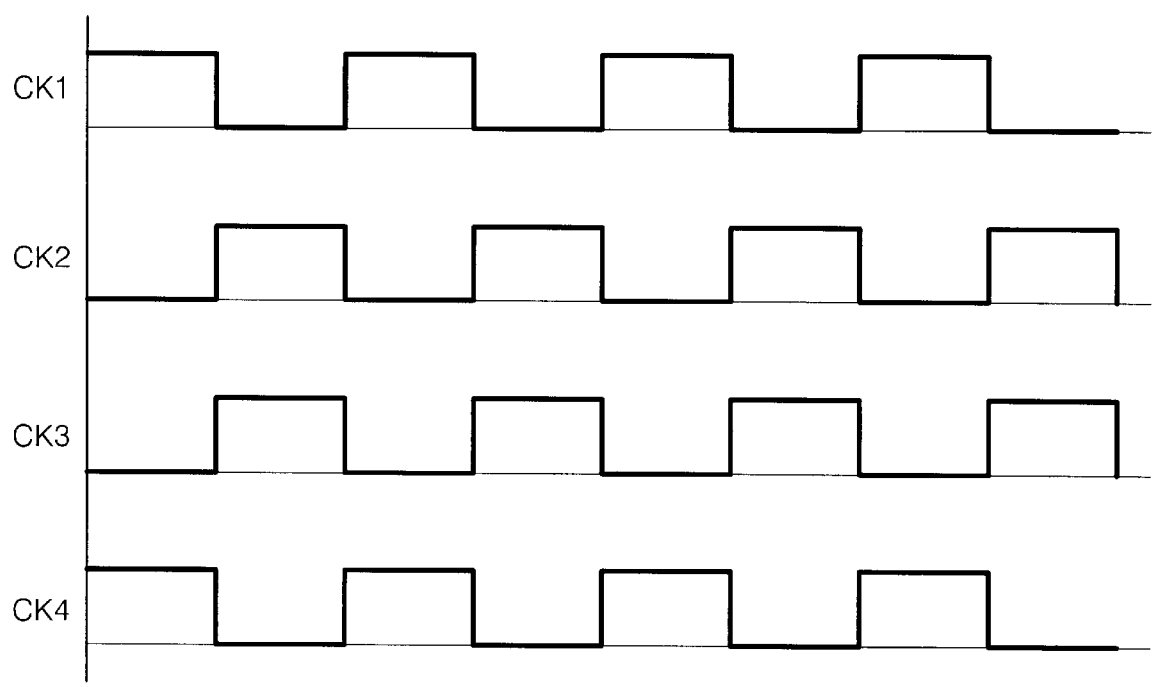
FIG. 7 is a timing chart of the control signal supplied to the converter of FIG. 6.

With reference to FIGS. 5 to 7, the overall operation of the third preferred embodiment of the apparatus for braking a washing machine comprises :a converter 501 consists of a plurality of transistors Q1, Q2, Q3 and Q4 connected in reverse parallel to a plurality of diodes D1 to D4 to convert AC voltage supplied from outer power source to the DC voltage and to control the switching functions when a control signal is delivered; a capacitor filter 502 smoothes the converted voltage from the converter 501; a motor driver 504 consists of a plurality of transistors Q5 to Q10 connected in reverse parallel to a plurality of diodes D5 to D10 to drive the motor M with the output voltage of the capacitor filter 502; a voltage detector 503 connects the capacitor filter 502 and the motor driver 504 and compares the voltage flows in the system against a reference voltage Vref and transfer the compared result to the microcomputer 506; and a microcomputer 506 delivers the control signal to control the motor driver 504 based on a information sent from the voltage detector and a signal sent from a sensor 505 that detects the speed and the position of the motor M.

The overall operation of the third embodiment of the apparatus for braking a washing machine is described hereinafter.

The converter 501 converts the commercial AC power supplied from outer power source to DC voltage, and the converted voltage is stably smoothed by the capacitor filter 502. And then, the smoothed DC voltage is supplied to the motor driver 504 which converts the smoothed voltage of the capacitor filter 502 to the driving voltage in order to drive the motor M under the control of the microcomputer 506.

When the dehydration process starts, the current in the system flows from the capacitor filter 502 to the motor M (I− in drawing). During the dehydration process, if a lid of the washing machine is opened or the unbalance state of the washing tube is detected, the dehydration process is ceased and the motor M is braked. At this time, the induction voltage is generated by the motor M, and then the induction voltage inducted from the motor M flows to the capacitor filter 502. As a result, the voltage of the capacitor filter 502 rapidly increases as the current flows in the direction of the capacitor filter 502 not the motor M (I+ in drawing).

The voltage detector 503 compares the reference voltage Vref with the voltage flowing in the system, and delivered the compared result to the microcomputer 506. If the detected voltage from the voltage detector 503 is higher than the reference voltage Vref, the microcomputer 506 sent out the control signal to the base terminals of a plurality of transistors of the converter 501.

Referring to FIGS. 6 and 7, the process by which the microcomputer 506 controls the converter 501 is illustrated hereinafter.

First, the converter 501 consists of 4 transistors Q1, Q2, Q3 and Q4 and 4 diodes D1, D2, D3 and D4 connected in reverse parallel to the transistors. And, if the signal of over-flown current detected by the voltage detector 503 is transferred to the microcomputer 506 which then sent out the corresponding control signal as illustrated in FIG. 7. Thereafter, the control signal is relayed to the base terminals of each transistor of the converter 501, thereby the converter 501 is controlled.

First and second transistors Q1, Q2 and third and fourth transistors Q3, Q4 of the converter 501 operate complementarily to each other when the control signal is delivered from the microcomputer 506. Also, first and fourth transistors Q1, Q4 and second and third transistors Q2, Q3 operate simultaneously.

If the over-flown voltage is detected in the system (DC link terminal) by the voltage detector 503, the transistors of the converter 501 selectively control the on/off switch functions through control signal of the microcomputer 506. As that result, the over-flown voltage in the system can be directed to flow to the commercial power source.

By the apparatus and the method of the foregoing description, the voltage of the capacitor filter 502 is maintained at the uniform level.

Following are a method for braking a washing machine accordance with the present invention using above described braking apparatus.

Figure 8:
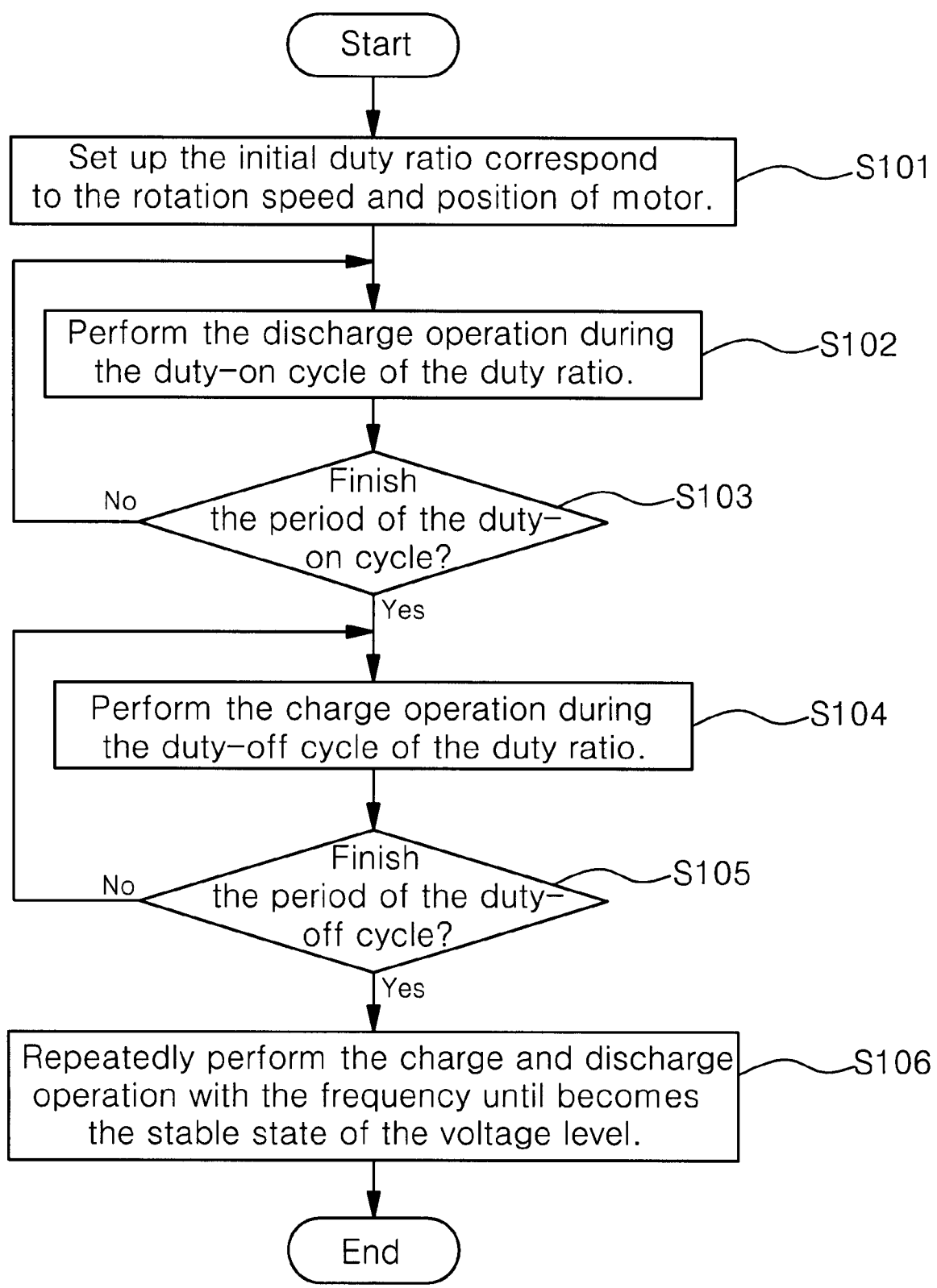
FIG. 8 is a flowchart of the first embodiment of a method for braking a washing machine according to this invention.

Referring to FIG. 2 and FIG. 8, a first embodiment of the method for braking a washing machine according to the present invention is illustrated in detail hereinafter.

First, when the braking is initiated, the initial PWM duty ratio is set up according to the information on the rotating speed and the position of the motor M. In general, the control of the inverter washing machine can be established by adjusting the speed or the voltage. In this invention, the control is established as the voltage is adjusted by the PWM signal (step S101). The capacity of the charge and the discharge of the current in the capacitor filter 202 are decided based on the duty ratio.

A discharge process between the capacitor filter 202 and the motor M during the duty-on cycle of the duty ratio established in step S101 is preformed (step S102), and then determines whether the duty-on cycle is finished or not (step S103). In the step S103, if the discharge process during the duty-on cycle is not finished, then the step S102 is repeated. On the other hand, if the process is finished, then the cycle is determined as a duty-off cycle and the charging process begins according to the duty ratio of the step S101 (step S104).

Next step is determining whether the charging process in the duty-off cycle is finished or not (step S105), and if the charging process is not finished, then the step S104 is repeated. Once the charging process in the duty-off cycle is finished, the charge-discharge according to the above steps is periodically performed (step S106). Thus, the over-flown voltage in the system becomes discharged.

Figure 9:
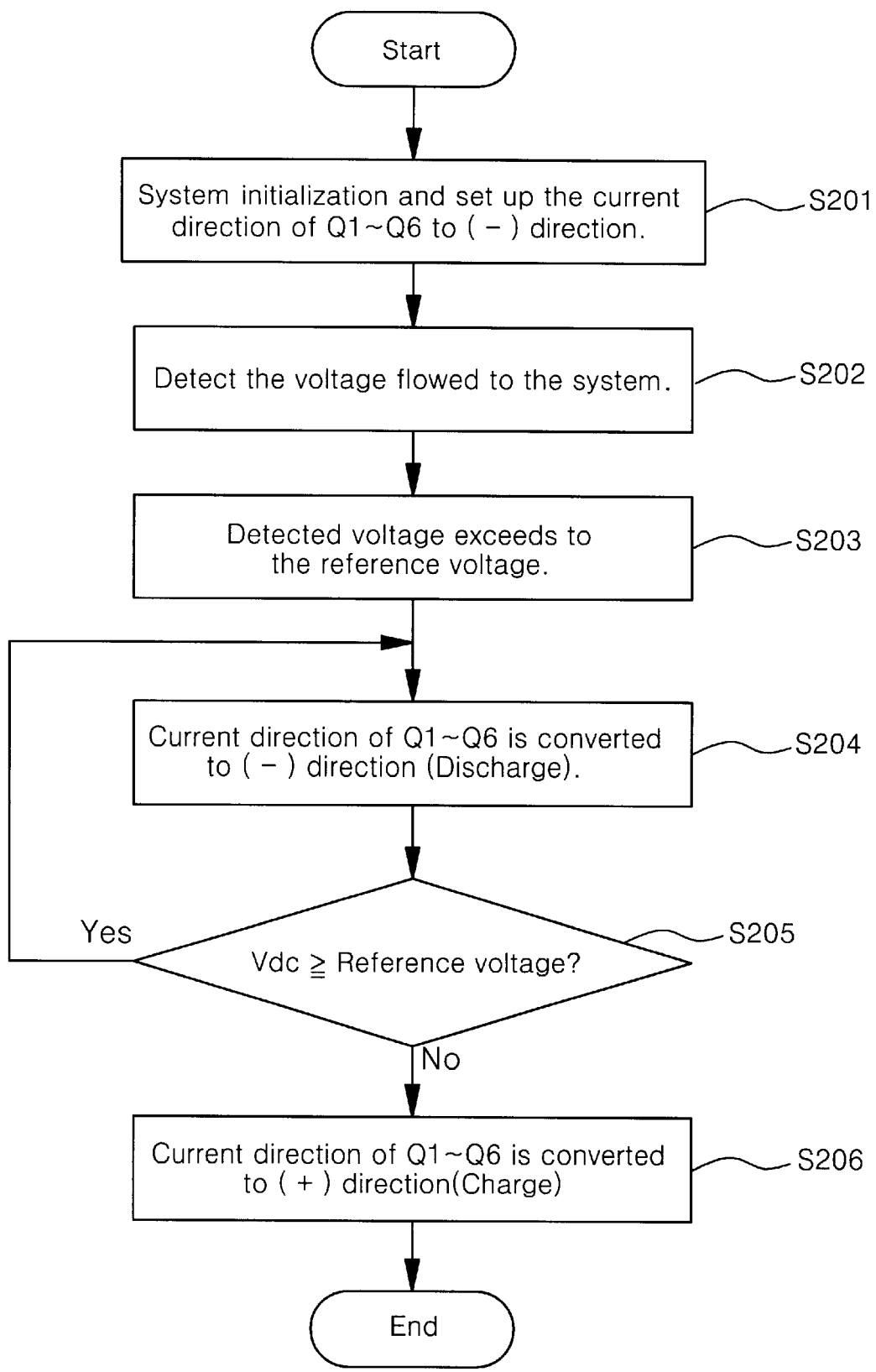
FIG. 9 is a flowchart of the second embodiment of the method for braking a washing machine according to this invention.

FIG. 9 is a flowchart illustrating the second embodiment in accordance with the present invention.

The overall operation of the second embodiment of a method for braking a washing machine according to the present invention is described in detail hereinafter with reference to FIG. 2 and FIG. 9.

First, in the event that emergency braking of a washing machine occurs, a plurality of transistors Q1 to Q6 and a plurality of diodes D1 to D6 connected in reverse parallel to the transistors are initialized so that the current in the motor driver 203 is guided to flows from the capacitor filter 202 to the motor M (I− direction) to discharge the over-flown voltage in the system (step S201).

Thereafter, the voltage detector 204 continuously detects the voltage between the motor M and the capacitor filter 202 (step S202), and when the detected voltage exceeds the predetermined reference voltage Vref level, the direction of the current in the motor driver 203 is from the capacitor filter 202 to the motor M so that the over-flown voltage in the system is discharged via the motor M (step S204).

While the over-flown voltage of the system flows in the direction of the motor M, the voltage level between the capacitor filter 202 and the motor driver 203 is continuously monitored by the voltage detector 204 to determine whether the detected voltage level exceeds the reference voltage or not (step S205). If the detected voltage level is higher than the reference voltage, the step S204 of the discharged operation is repeated. However, if the detected voltage level falls below the reference voltage, the discharged operation of the step S204 is discontinued, and the current in the motor driver 203 is directed to flow from the motor M to the capacitor filter 202 so that the voltage can be charged to the capacitor filter 202 (step S206).

In the event that the voltage level of the system is higher than the normal level, the steps S202 to S206 is repeated. As a result, the normal voltage level is always maintained as the voltage over-flown in the system is prevented by the software without using the dynamic braking resistor.

Figure 10:
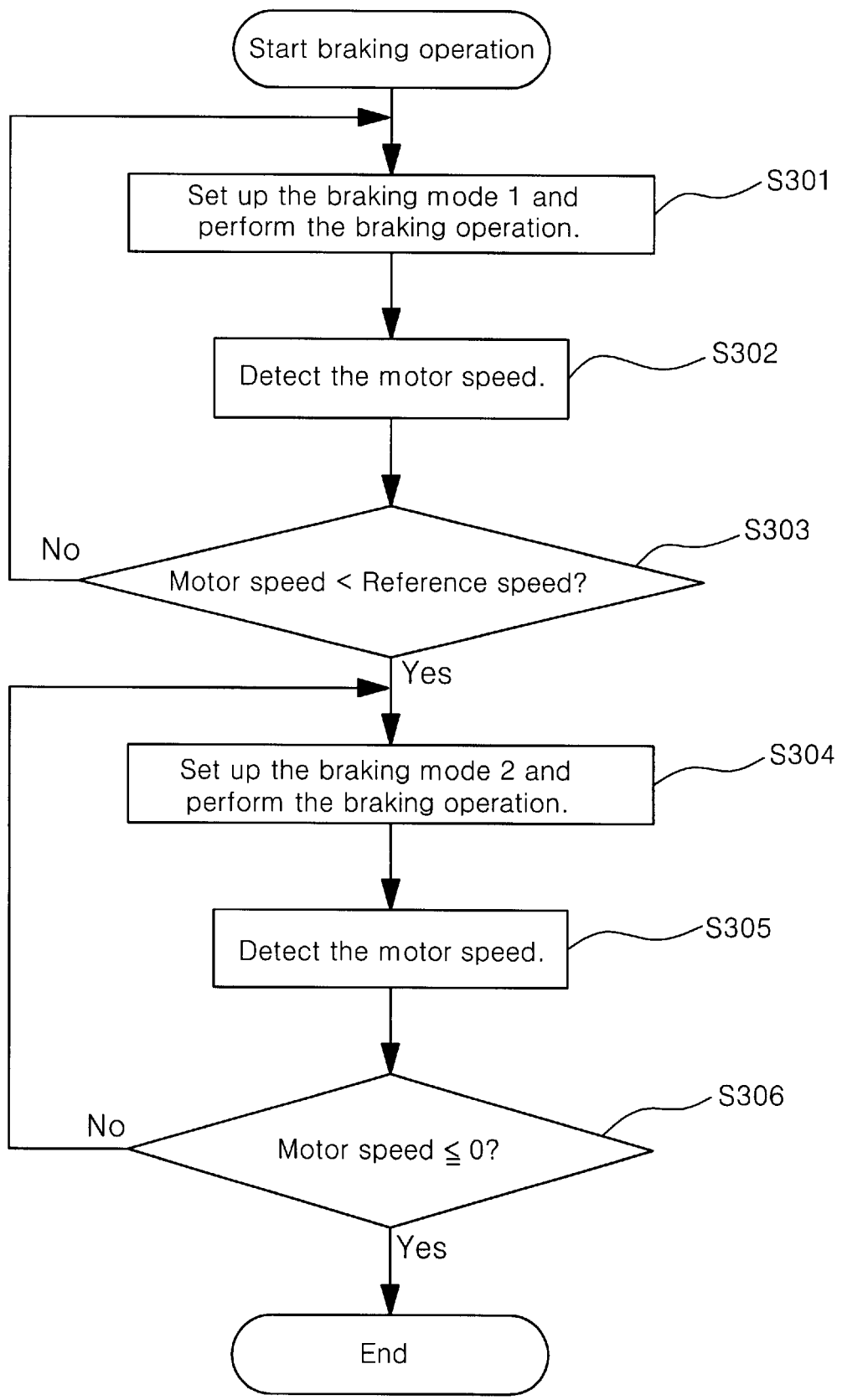
FIG. 10 is a flowchart of the third embodiment of the method for braking a washing machine according to this invention.

FIG. 10 is a flowchart illustrating a third embodiment of a method for braking a washing machine in accordance with the present invention.

The third embodiment in accordance with the present invention relates to a adjustment of the braking process according to the rotation speed of the motor to achieve a smoothed braking of the system. Referring to FIGS. 2 and 10, the overall operations according to the third embodiment of a method for braking a washing machine is described hereinafter.

A first braking mode occurs at the same time as the braking operation begins (step S301). In the beginning state of the braking operation, amount of the revival energy generated is large due to the high-speed rotation of the motor M. Therefore, in the initial stage of the braking operation, the braking mode with the most braking capability is used. That is, transistors Q1 to Q6 of the motor driver 203 selectively operate on/off functions of the switch base on the duty ratio of the microcomputer 206, thereby the over-flown voltage is either charged or discharged to the capacitor filter 202.

Step S302 whereby to detect the speed of the motor, and during the braking operation by the first braking mode, the speed of the motor is continuously detected and compared with the predetermined reference speed of the system (step S303).

If it is determined that the speed of the driven motor M is slower than the reference speed, the second braking mode is initiated (step S304). During the second braking mode, the induction voltage generated in the motor M is charged to the capacitor filter 202 by switching off the transistors Q1 to Q6 of the motor driver 203 so that the over-flown voltage is discharged. The second braking mode has less braking capability than the first braking mode. Since the braking of the motor is initially performed by the first braking mode, the induction voltage generated is the motor M has been lowered by the time the second braking mode is in operation.

While step S304 is operating, detection of the speed of the motor is conducted (step S305). And step S305 is performed until the motor comes to complete stopped (step S306).

Figure 11:
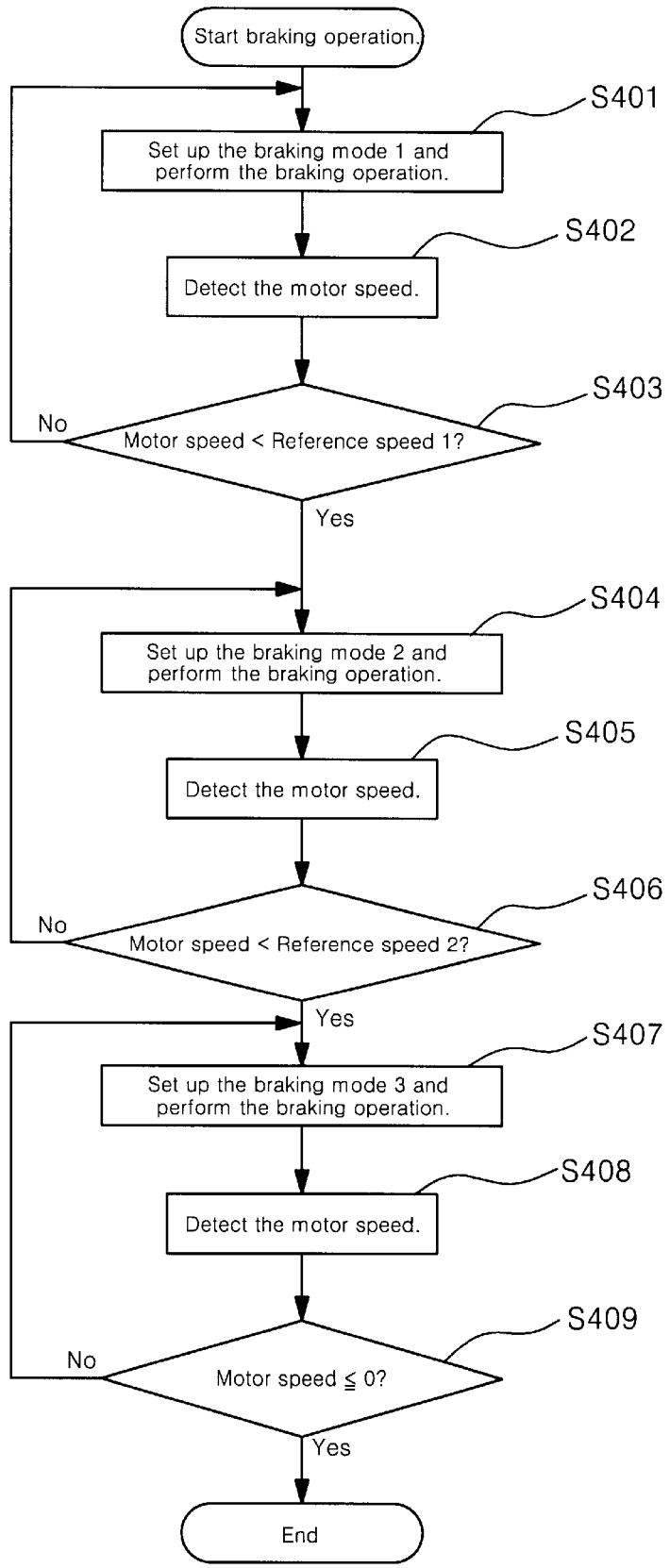
FIG. 11 is a flowchart of the fourth embodiment of the method for braking a washing machine according to this invention.

FIG. 11 is a flowchart showing a forth embodiment of a method for braking a washing machine according to the present invention. Step S401 to step S404 of the fourth embodiment of the present invention are same as the step S301 to the step S304 of the third embodiment, therefore, the detailed descriptions have been omitted.

The step S405 is detecting the speed of the motor M while the step S404 is taking place. And, the detected motor M speed in step S405 is compared to a second reference speed (step S406) and if the motor speed is slower than the second reference speed then the third braking mode is initiated (step S407).

In the third braking mode, the induction voltage generated in the motor M is discharged through the motor M as the switch of transistors Q4 to Q6 of the lower voltage terminal of the motor driver 203 is turned to on state.

Since the third braking mode is the process where the over-flown voltage is discharged through the motor in which the induction voltage is initially generated, there is a limit to amount of the over-flown voltage that can be discharged thus the motor M speed of the third braking mode is slower than the second braking mode. While the step S407 is performing, the motor speed is continuously monitored (step S408) until the motor comes to complete stop.

Three different types of the braking mode have been described as examples, but the braking modes with various braking capabilities may be implemented through the microcomputer 206 program.

Figure 12:
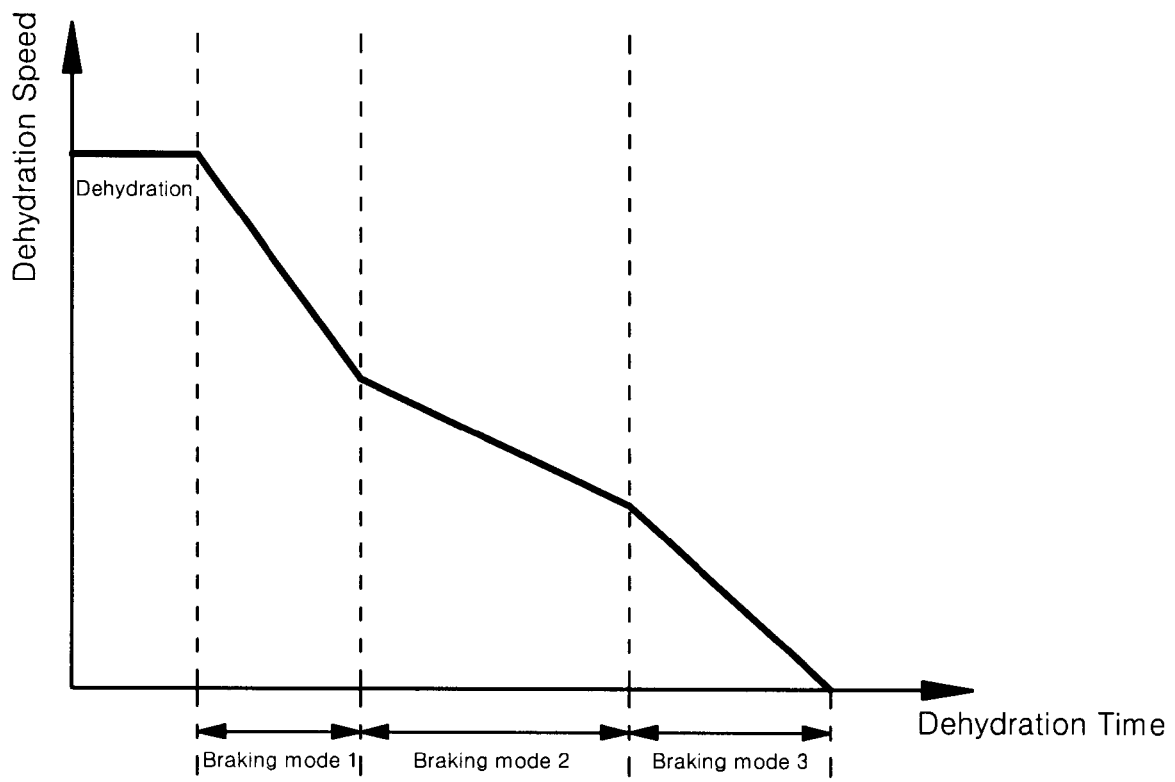
FIG. 12 is a graph showing the interrelation between the hydration time and the motor corresponding to the third embodiment and the forth embodiment illustrated in FIG. 10 and FIG. 11, respectively.

FIG. 12 is a graph showing the interrelation between a hydration time and speed when the process of braking the motor according to the third embodiment and the fourth embodiment of the present invention have been applied. The graph clearly indicates that more smoothed braking is achieved by the present invention than the conventional braking mode which utilizes only one braking mode.

Figure 13:
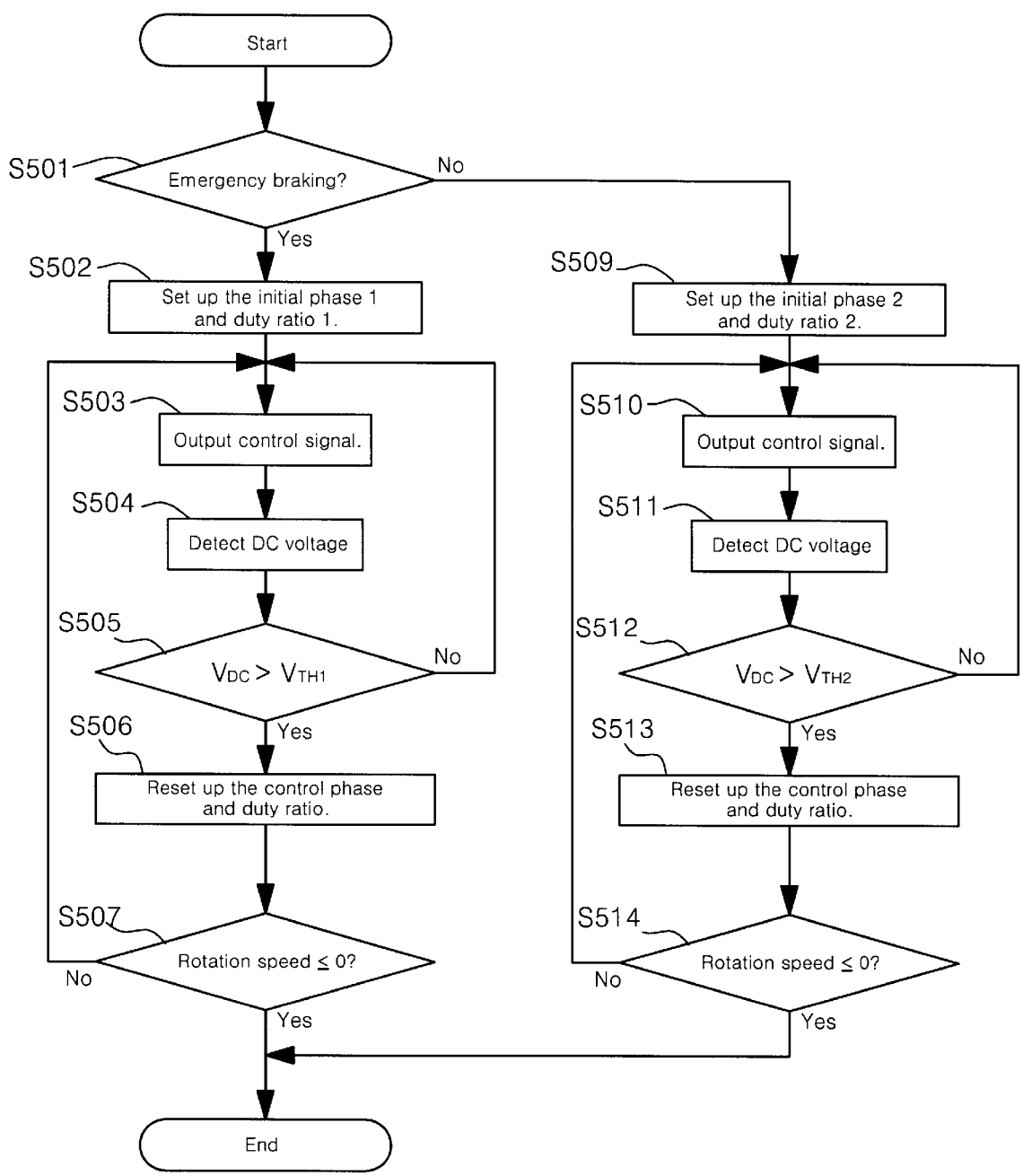
FIG. 13 is a flowchart of the fifth embodiment of the method for braking a washing machine according to this invention.

FIG. 13 is a flowchart showing a fifth embodiment of a method for braking a washing machine in accordance with the present invention.

The fifth embodiment according the present invention applies a method in which a plurality of braking methods are used as the braking methods are divided into a normal braking and an emergency braking.

Referring to FIG. 2 and FIG. 13, the fifth embodiment of the present invention is described hereinafter.

First, when the braking is initiated, it is determined whether the braking the washing machine is the emergency braking situation, such as the door of the washing machine is opened before the dehydration process has been ended or the unbalance of a washing tube is detected, or the normal braking situation in which the dehydration has been completed (step S501).

If it is determined in step S501 that the emergency braking has been occurred, the first initial phase and duty ratio corresponding to the emergency braking is then set up (step S502). Corresponding to the over-voltage generated by the emergency braking, the logical charged/discharged loop between the motor M and the capacitor filter 202 is established through controlling on/off functions of the switch of transistors Q1 to Q6 and diodes D1 to D6 of the motor driver 203 (step 503).

The voltage flowing in the system is continuously monitored by the voltage detector, and the corresponding signal is delivered to the microcomputer 206 (step S504) which compares the first reference voltage Vth1 to the detected voltage level (step S505). If the detected voltage is higher than the first reference voltage Vth1, then the control phase and duty ratio corresponding to the detected voltage are set up again (step S507). On the contrary, if the detected voltage is lower than the first reference voltage, the braking operation is performed based on the phase and duty ratio initially set up in the step S503.

Thereafter, the motor M speed is monitored to determine whether it's rotating. And if the motor is rotating then step S503 to step S507 are repeated until the motor M comes to complete stop.

In the event of the emergency braking mode, the first reference voltage Vth1 is compared to the detected voltage, and control phase and duty ratio are re-set such that the over-flown voltage generated from the braking of the motor M does not exceed to the designated reference voltage.

In the event of the normal braking mode, such as a key is inputted by user or the dehydration process is completed, the microcomputer 206 set up the second phase and duty ratio (step S509), and outputs the control signal to the motor driver 203 (step S510).

After, the voltage Vdc flows in the system is detected by the voltage detector 204, and the detected signal is outputted to the microcomputer 206 (step S511). Then, the microcomputer 206 compares the second reference voltage Vth2 with the detected voltage (step S512).

In the case that the comparison result of the step S512 indicates that the detected voltage Vdc is higher than the second reference voltage Vth2, then the control phase and the duty ratio are set up again according to the detected voltage (step S513). If the detected voltage Vdc is lower than the second reference voltage, the initially established phase and duty ratio in the step S510 are used for the braking operation.

Thereafter, if the rotating speed of the motor M is detected as rotating, then the steps 510 to 514 are repeatedly carried out until the motor M is stopped.

In the fifth embodiment of a method for braking a washing machine in accordance with the present invention, the motor braking operation is divided into the emergency mode and the normal mode. The initial phase and the duty ratio are differently set up for each mode in order to control the system voltage from exceeding the reference voltage level, thus the vibration noise is minimized and the life span of the motor is extended.

Figure 14:
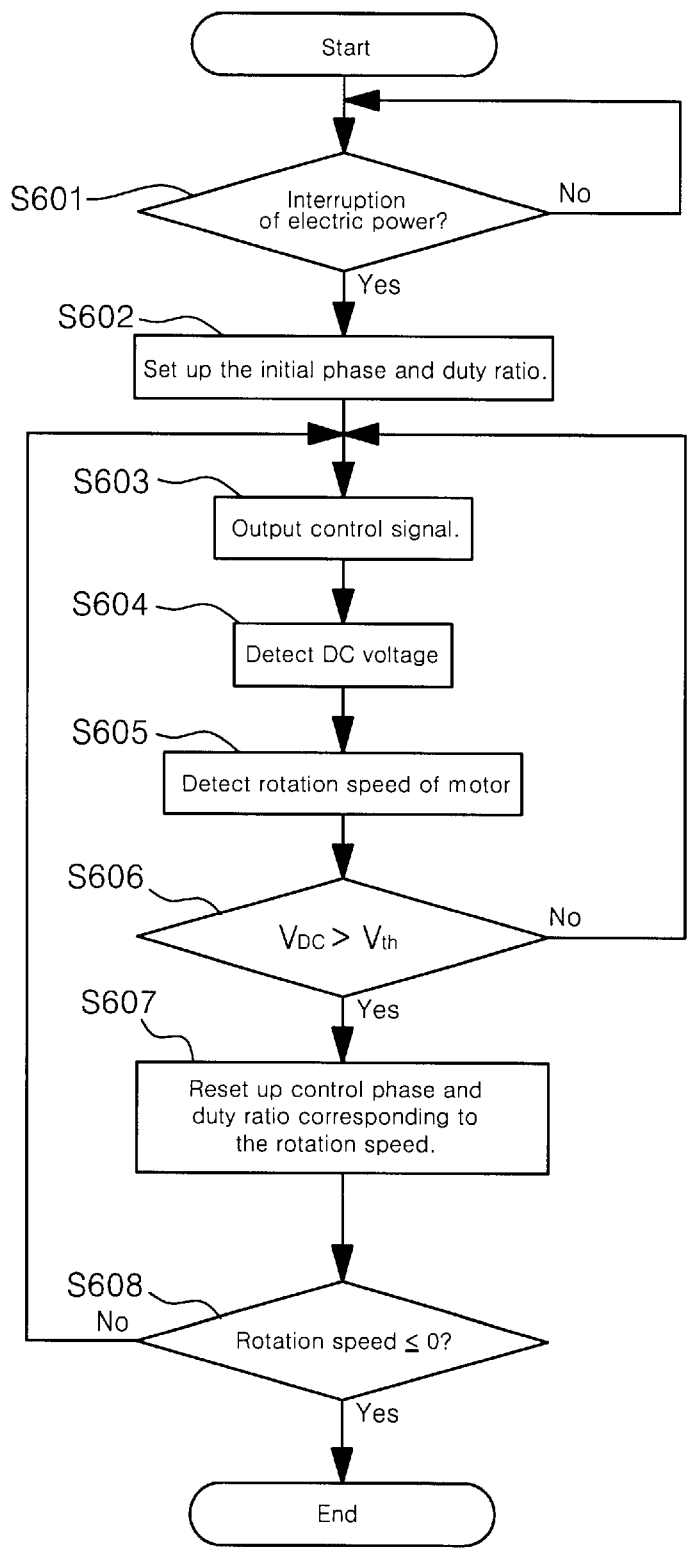
FIG. 14 is a flowchart of the sixth embodiment of the method for braking a washing machine according to this invention.

FIG. 14 is a flowchart of a sixth embodiment of a method for braking a washing machine according to this invention.

Referring to FIG. 3 and FIG. 14, the sixth embodiment relates to a method for the braking washing machine when the interruption of electric power occurs during a washing operation. Firstly, it is determined whether the interruption of electric power has been occurred or not through the outputted signal from the interruption detector 307 which detects the commercial AC power (step S601). If it is determined that the interruption of electric power has been occurred, then the initial phase and duty ratio are set up to brake the motor M (step S602), and the control signal is outputted to the motor driver 303 (step S603).

Thereafter, the voltage flows in the system and the rotating speed of the motor M is detected by the voltage detector 304 (steps S604 and S605). And, the detected voltage Vdc is then compared with the predetermined reference voltage Vth (step S606). If the detected voltage Vdc is higher than the reference voltage Vth, then the phase and duty ratio of the control signal are adjusted according to the rotating speed of the motor M (step S607), whereas if the detected voltage Vdc is lower than the reference voltage Vth, then the braking operation is continued using the initial phase and duty ration of the step 603.

After, it has been decided whether the motor M is stopped or not (step S608), and if the motor M is not stopped, from steps S603 to S608 are repeatedly performed if it is determined that the motor M is rotating through detecting the rotating speed of the motor M (step 608).

What is claimed is:

1. An apparatus for braking a washing machine comprising:
   a rectifier for converting AC power supplied to the system to DC power;
   a capacitor filter for smoothing a rectified DC power;
   a motor driver for driving a motor of the washing machine by converting the smoothed DC power to three phase power;
   a voltage detector for detecting the smoothed DC power in real-time;
   a sensor detecting a position and a speed of the motor in real-time; and
   a microprocessor for outputting a control signal based on a comparison between an output signal of the voltage detector and a predetermined reference voltage to activate charge/discharge operations of the voltage between the capacitor filter and the motor without use of a dynamic braking resistor.

2. The apparatus of claim 1, further comprising an interruption detector configured to output a signal to said microcomputer upon detection of the interruption of the AC power supplied to the system.

3. A method for braking a washing machine, comprising:
   (a) setting up an initial data of a duty ratio corresponding to a detected speed and a rotating position of a motor of the washing machine, when the motor is braked;
   (b) discharging a voltage of a capacitor filter to a motor driver of the motor during a duty-on cycle according to the duty ratio set up in step (a); and
   (c) charging a voltage to the capacitor filter from the motor driver during a duty-off cycle when the duty-on cycle of the step (b) is finished, whereby, when the motor is braked, a voltage of the capacitor filter is maintained at a normal level as the voltage is either charged or discharged.

4. The method of claim 3, wherein step (b) and step (c) are repeatedly performed until the system voltage level is stabilized.

5. A method for braking a washing machine, comprising:
   (a) initializing the system so that a current of a motor driver of the washing machine is directed to flow to a motor of the washing machine;
   (b) detecting a voltage flowing in the system when braking the motor;
   (c) comparing the detected voltage to a reference voltage; and
   (d) reversing the current direction to the opposite direction based on the results of step (c), wherein if the detected voltage is higher than the reference voltage, then the current direction remains the same, and if the detected voltage is lower than the reference voltage, then the current direction is changed to an opposite direction, wherein the method is performed without the use of a dynamic braking resistor.

6. The method of claim 5, wherein if the detected voltage is higher than the reference voltage, the current direction is reversed.

7. A method for braking a washing machine, comprising:
   (a) initiating a first braking mode at the start of a braking procedure;
   (b) comparing a detected motor speed of a motor of the washing machine with a reference speed while step (a) is in progress; and
   (c) initiating a second braking mode when the motor speed is determined to be slower than the reference speed, wherein the method is performed without the use of a dynamic braking resistor.

8. The method of claim 7, wherein a braking capability of the first braking mode is higher than a braking capability of the second braking mode.

9. A method for braking a washing machine, comprising:
   (a) initiating a first braking mode at the start of a braking procedure;
   (b) comparing a detected motor speed of a motor of the washing machine with a first reference speed while the step (a) is in progress;
   (c) initiating a second braking mode when the motor speed is determined to be slower than the reference speed;
   (d) comparing a detected motor speed with a second reference speed while said step (c) is in progress; and
   (e) initiating a third braking mode when the motor speed is slower than the second reference speed, wherein the method is performed without the use of a dynamic braking resistor.

10. The method of claim 9, wherein the braking capability of the first braking mode is greater than the braking capability of the second braking mode, and wherein the braking capability of the second braking mode is greater than the braking capability of the third braking mode.

\* \* \* \* \*